(12) United States Patent
Jeong et al.

(10) Patent No.: US 8,749,514 B2
(45) Date of Patent: Jun. 10, 2014

(54) TOUCH SCREEN PANEL

(75) Inventors: Hwan-Hee Jeong, Yongin (KR);
Sung-Ku Kang, Yongin (KR)

(73) Assignee: Samsung Display Co., Ltd., Yongin,
Gyeonggi-Do (KR)

( * ) Notice: Subject to any disclaimer, the term of this patent is extended or adjusted under 35 U.S.C. 154(b) by 418 days.

(21) Appl. No.: 12/926,004

(22) Filed: Oct. 20, 2010

(65) Prior Publication Data

US 2011/0234510 A1    Sep. 29, 2011

(30) Foreign Application Priority Data

Mar. 23, 2010   (KR) .................. 10-2010-0025662

(51) Int. Cl.
*G06F 3/045* (2006.01)
(52) U.S. Cl.
USPC ........................................ 345/174; 178/18.06
(58) Field of Classification Search
USPC ................... 345/173–184; 178/18.01–19.04;
174/250–254; 257/41; 400/472;
349/12; 340/407.1
See application file for complete search history.

(56) References Cited

U.S. PATENT DOCUMENTS

2002/0149731 A1* 10/2002 Slikkerveer et al. .......... 349/153
2008/0264699 A1   10/2008 Chang et al.
2010/0261119 A1* 10/2010 Li et al. ......................... 430/319

FOREIGN PATENT DOCUMENTS

KR   10-2008-0096352 A   10/2008
KR        10-0944519 B1    2/2010

OTHER PUBLICATIONS

Korean Office Action in KR 10-2010-0025662, dated May 26, 2011 (Jeong, et al.).

* cited by examiner

*Primary Examiner* — Abbas Abdulselam
*Assistant Examiner* — Gerald Oliver
(74) *Attorney, Agent, or Firm* — Lee & Morse, P.C.

(57) ABSTRACT

A touch screen panel includes a transparent substrate, a plurality of first sensing cells on the transparent substrate, the first sensing cells being connected to each other along a first direction, a plurality of second sensing cells between the first sensing cells and insulated from the first sensing cells, the second sensing cells being connected to each other along a second direction, a plurality of first connection patterns connecting the first sensing cells along the first direction, a plurality of second connection patterns connecting the second sensing cells along the second direction, the second connection patterns intersecting the first connection patterns, an insulating layer between the first and second connection patterns, the second connection patterns crossing over the insulating layer, and a plurality of conductive auxiliary patterns on the second connection patterns and electrically connected to the second connection patterns.

12 Claims, 3 Drawing Sheets

TOUCH SCREEN PANEL

BACKGROUND

1. Field

Example embodiments relate to a touch screen panel, and more particularly, to a touch screen panel capable of preventing a driving failure caused by static electricity.

2. Description of the Related Art

A touch screen panel is an input device that allows a user's instruction to be input by selecting an instruction content displayed on a screen, e.g., an image display device, with the user's hand or object. Since such a touch screen panel can be substituted for a separate input device connected to an image display device, such as a keyboard or a mouse, its application fields have been gradually extended.

The touch screen panel may be formed on a front face of the image display device to convert a contact position of the user's hand or object into an electrical signal. Here, the user's hand or object may be in direct contact with the touch screen panel at the contact position. Accordingly, the instruction content selected at the contact position is input as an input signal to the image display device.

Touch screen panels may be divided into resistive overlay touch screen panels, photosensitive touch screen panels, capacitive touch screen panels, and the like. For example, a capacitive touch screen panel converts a contact position into an electrical signal by sensing a change in capacitance formed between a conductive sensing cell and an adjacent sensing cell, ground electrode or the like, when a user's hand or object is in contact with the touch screen panel. In order to clearly detect a contact position at a contact surface, a conventional capacitive touch screen panel may include first sensing cells connected along a first direction and second sensing cells connected along a second direction.

SUMMARY

Embodiments are therefore directed to a touch screen panel, which substantially overcomes one or more of the problems due to the limitations and disadvantages of the related art.

It is therefore a feature of an embodiment to provide a touch screen panel capable of preventing a driving failure caused by static electricity.

At least one of the above and other features and advantages may be realized by providing a touch screen panel, including a transparent substrate, a plurality of first sensing cells on the transparent substrate, the first sensing cells being connected to each other along a first direction, a plurality of second sensing cells between the first sensing cells and insulated from the first sensing cells, the second sensing cells being connected to each other along a second direction, a plurality of first connection patterns connecting the first sensing cells along the first direction, a plurality of second connection patterns connecting the second sensing cells along the second direction, the second connection patterns intersecting the first connection patterns, an insulating layer between the first and second connection patterns, the second connection patterns crossing over the insulating layer, and a plurality of conductive auxiliary patterns on the second connection patterns and electrically connected to the second connection patterns.

The conductive auxiliary patterns may be locally positioned on the second connection patterns at the respective start and end portions of a section in which each of the second connection patterns crosses over the insulating layer.

Each of the conductive auxiliary patterns may be positioned on the second connection pattern to be connected from the start portion to the end portion of the section in which each of the second connection patterns crosses over the insulating layer.

The conductive auxiliary patterns may directly contact the second connection patterns.

The second connection patterns may be between the insulating layer and respective conductive auxiliary patterns.

Each conductive auxiliary pattern may overlap at least one connection region between a second connection pattern and a respective second sensing cell. The conductive auxiliary pattern may have a bent shape, the conductive auxiliary pattern overlapping a portion of the second connection pattern and a portion of the respective second sensing cell.

Each conductive auxiliary pattern may be continuous along an entire length of the insulating layer, the length of the insulating layer extending along the second direction.

The first sensing cells may be positioned in the same layer as the second sensing cells to have separated patterns from one another, and may be electrically connected along the first direction to the first connection patterns through the exposed regions of the first connection patterns.

The second sensing cells and the second connection patterns on each row or column line may be integrally formed with each other.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
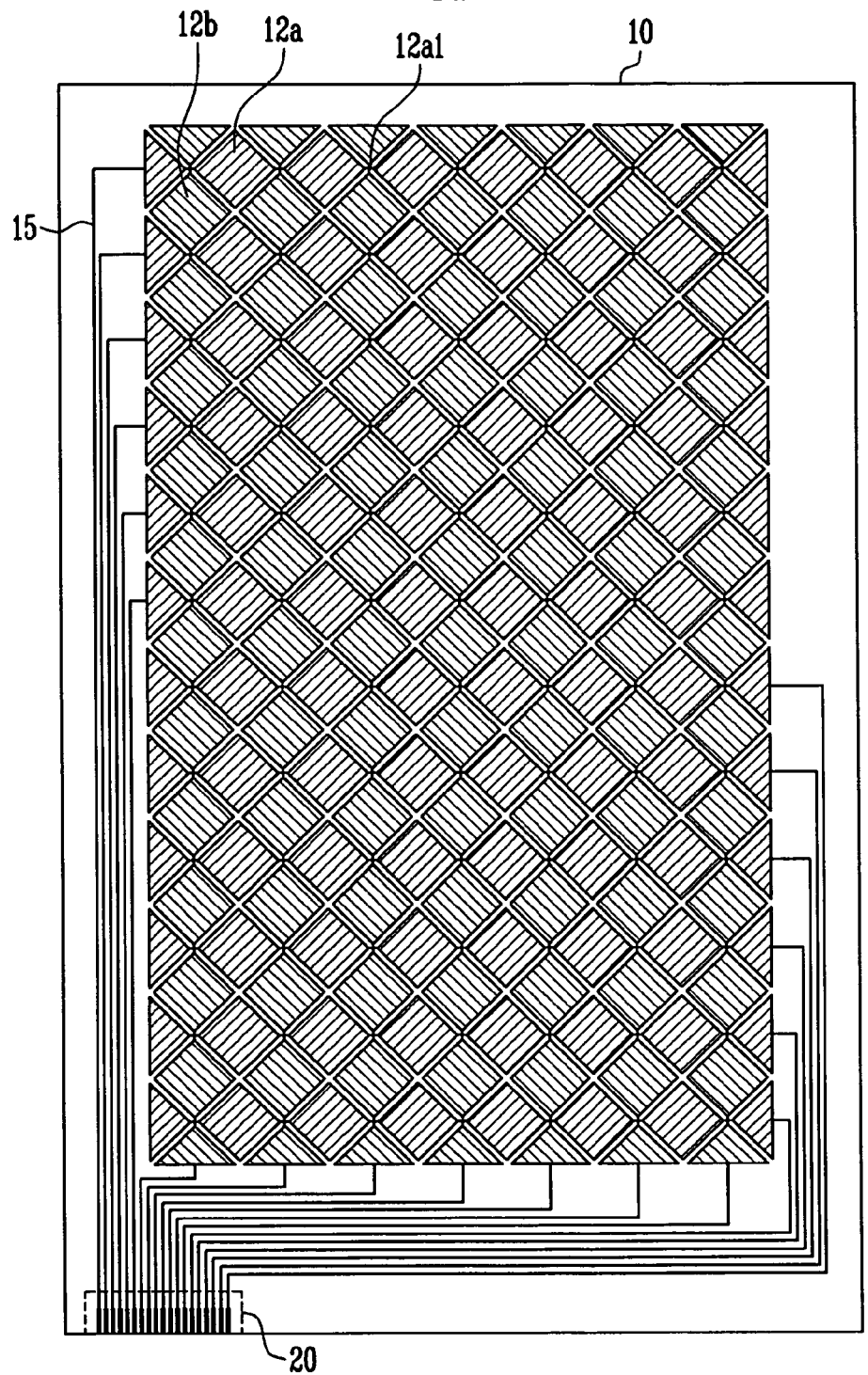
FIG. 1 illustrates a schematic plan view of a touch screen panel according to an embodiment.

Korean Patent Application No. 10-2010-0025662, filed on Mar. 23, 2010, in the Korean Intellectual Property Office, and entitled: "Touch Screen Panel," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer (or element) is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Also, when a layer is referred to as being "connected to" another element, it can be directly connected to the other element or one or more intervening layers may be present. Like reference numerals refer to like elements throughout.

FIG. 1 illustrates a schematic plan view of a touch screen panel according to an embodiment. Referring to FIG. 1, the touch screen panel according to an embodiment may include a transparent substrate 10, a plurality of first sensing cells 12a and a plurality of second sensing cells 12b formed on the transparent substrate 10, and position detecting lines 15 for connecting the first and second sensing cells 12a and 12b to an external drive circuit through a pad portion 20.

The first sensing cells 12a may be formed to be connected in a first direction, e.g., a row line direction, using a transparent electrode material, e.g., indium tin oxide (ITO). Thus, row lines of the first sensing cells 12a may be connected to some of the position detecting lines 15, respectively.

Like the first sensing cells 12a, the second sensing cells 12b may be formed using a transparent electrode material. The second sensing cells 12b may be disposed in a same layer as the first sensing cells 12a and may be connected to each other along a second direction different from the first direction, e.g., a column line direction. The second sensing cells 12b may be disposed between the first sensing cells 12a, and may be insulated from the first sensing cells 12a. Thus, column lines of the second sensing cells 12b may be connected to some of the position detecting lines 15, respectively. If the first and second sensing cells 12a and 12b are positioned in the same layer, the touch screen panel may have entirely uniform reflexibility.

The position detecting lines 15 may connect the first and second sensing cells 12a and 12b to an external drive circuit (not shown), e.g., a position detecting circuit, through the pad portion 20. The position detecting lines 15 may be disposed outside the outline of the touch screen panel while avoiding a touch active area in which images are displayed. The position detecting lines 15 may include a wide range of suitable materials, e.g., a transparent electrode material used for forming the first and second sensing cells 12a and 12b or a low-resistance material. Examples of low-resistance materials may include molybdenum (Mo), silver (Ag), titanium (Ti), copper (Cu), aluminum (Al) or molybdenum/aluminum/molybdenum (Mo/Al/Mo).

The aforementioned touch screen panel is a capacitive touch screen panel. If a contact object, e.g., a user's hand or a stylus pen, contact the touch screen panel, a change in capacitance based on a contact position is transferred from the first and second sensing cells 12a and 12b to the external drive circuit via the position detecting lines 15 and the pad portion 20. Then, the change in capacitance is converted into an electrical signal by X and Y input processing circuits (not shown) and the like, so that the contact position is detected.

Figure 2:
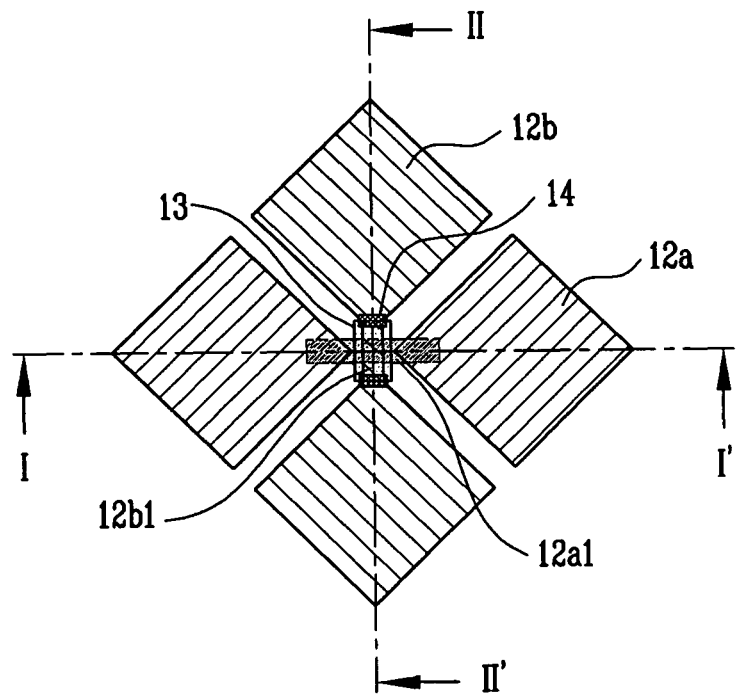
FIG. 2 illustrates an enlarged view of sensing cells and connection patterns according to an embodiment.
Figure 3:
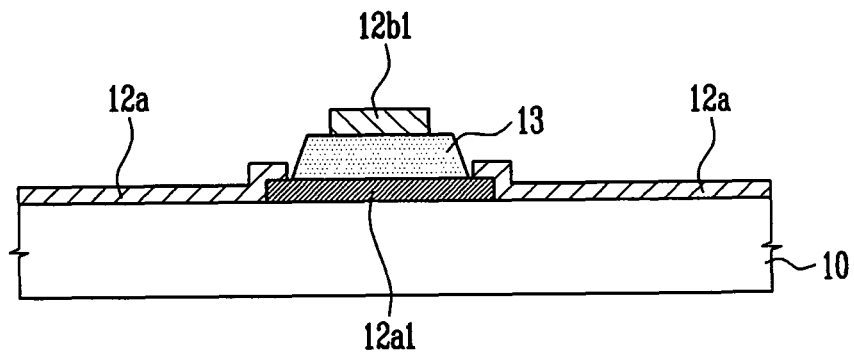
FIG. 3 illustrates a cross-sectional view taken along line I-I' of FIG. 2.

FIG. 2 illustrates an enlarged view of the first and second sensing cells 12a and 12b with their corresponding connection patterns. FIG. 3 illustrates a cross-sectional view taken along line I-I' of FIG. 2, and FIG. 4 illustrates a cross-sectional view taken along line II-II' of FIG. 2.

Figure 4:
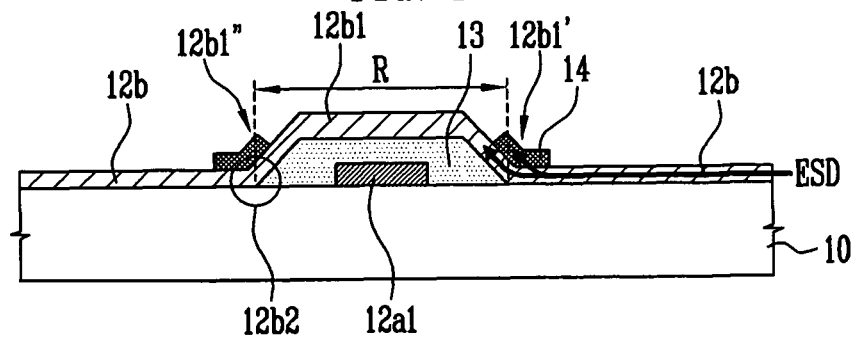
FIG. 4 illustrates a cross-sectional view taken along line II-II' of FIG. 2.

For convenience of illustration, only a pair of first and second connection patterns is shown in FIGS. 2 to 4. However, the same structure can be applied to other first and second connection patterns, and therefore, a plurality of first and second connection patterns will be inclusively described. Thus, the first connection pattern and the second connection pattern will be designated as a plurality of first connection patterns and a plurality of second connection patterns.

Referring to FIG. 2, the first sensing cells 12a may be positioned in the same layer as the second sensing cells 12b to have separated patterns from one another, e.g., the first sensing cells 12a may be spaced apart from each other and from adjacent second sensing cells 12b. The first sensing cells 12a may be connected to each other along the first direction by the first connection patterns 12a1.

Like the first sensing cells 12a, the first connection patterns 12a1 may be patterned to have separated patterns from one another. As shown in FIG. 1, a plurality of first connection patterns 12a1 may be disposed along a line in the first direction, e.g., each of the row lines. The first connection patterns 12a1 may be formed of the same transparent electrode material as the first and second sensing cells 12a and 12b or of an opaque electrode material of low resistance. The width of the first connection patterns 12a1 may be controlled so as to prevent or substantially minimize visibility of the first connection patterns 12a1.

The second sensing cells 12b may be disposed between the first sensing cells 12a to be insulated from the first sensing cells 12a. The second sensing cells 12b may be connected to each other along the second direction by second connection patterns 12b1. The second connection patterns 12b1 may intersect with the first connection patterns 12a1 with an insulating layer 13 interposed therebetween. That is, the second connection patterns 12b1 may intersect the first connection patterns 12a1 while crossing over, e.g., overlapping, the insulating layer 13. Thus, the second sensing cells 12b may be connected along the second direction by the second connection patterns 12b1.

The second connection patterns 12b1 may be patterned to be integrally formed with the second sensing cells 12b, e.g., in a same patterning process. As an example, the second connection patterns 12b1 may be integrally formed with each of the column lines of the second sensing cells 12b. It is noted, however, that example embodiments are not limited thereto. As another example, the second connection patterns 12b1 may be integrally formed with each row line of the second sensing cells 12b. In this case, the first connection patterns 12a1 on each column line may be connected to one another.

The first and second connection patterns 12a1 and 12b1 and the first and second sensing cells 12a and 12b will be described in detail with reference to FIGS. 3-4. As shown in FIG. 3, the first connection pattern 12a1 may be formed on the transparent substrate 10 to have separated patterns from one another. The insulating layer 13 may be positioned on the first connection patterns 12a1 to partially expose regions of the first connection patterns 12a1, e.g., to expose edges of the first connection patterns 12a1. The exposed regions of the first connection patterns 12a1 may define contact regions for the first connection patterns 12a1 and the first sensing cells 12a.

The first sensing cells 12a may be electrically connected to the first connection patterns 12a1 through the exposed regions of the first connection patterns 12a1, e.g., the first sensing cells 12a may directly contact the first connection patterns 12a1 via the exposed regions of the first connection patterns 12a1. Thus, the first sensing cells 12a may be connected along the first direction.

The secondسtsensing cells 12b may be disposed between the first sensing cells 12a in the same layer as the first sensing cells 12a. As shown in FIG. 4, the second sensing cells 12b may be connected along the second direction by the second connection patterns 12b1 connected to one another via the top of the insulating layer 13. The second sensing cells 12b may be integrally formed with the second connection patterns 12b1. In this case, the second sensing cells 12b and the second connection patterns 12b1 may be patterned from a patterning process. It is noted, however, that example embodiments are not limited thereto, e.g., the second sensing cells 12b and the second connection patterns 12b1 may be formed separately from each other in different layers so as to be electrically connected to each other through contact holes and the like.

When the second connection patterns 12b1 and the second sensing cells 12b are integrally formed with each other, the second sensing cells 12b may be formed, e.g., as transparent electrode patterns having a diamond shape and connected to each other via second connection patterns 12b1 shaped as narrow bridges between the transparent electrode patterns. The second connection patterns 12b1 may have narrow widths, e.g., relative to the second sensing cells 12b, and may connect adjacent second sensing cells 12b to each other while crossing over, e.g., completely overlapping along the second direction, the insulating layer 13. Thus, start and end portions of the second connection patterns that cross over the insulating layer 13 may have increased resistance. Therefore, since these portions are particularly weak to static electricity, they may be easily damaged due to disconnection caused by the static electricity, and the like.

Therefore, according to example embodiments, the touch panel may include conductive auxiliary patterns 14 electrically connected to the second connection patterns 12b1, as illustrated in FIGS. 2 and 4. The conductive auxiliary pattern 14 may be formed on, e.g., directly on, the second connection pattern 12b1 above the insulating layer 13, such that the second connection pattern 12b1 may be between the insulating layer 13 and the conductive auxiliary pattern 14. As such, static electricity may be diffused into the conductive auxiliary patterns 14. Accordingly, it may be possible to prevent the disconnection defect of the second connection patterns 12b1 caused by the static electricity, thereby preventing a driving failure of the touch screen panel.

In detail, as shown in FIG. 4, the conductive auxiliary patterns 14 may be locally positioned in regions where resistance may be locally increased. In other words, the conductive auxiliary patterns 14 may be, e.g., selectively, positioned to overlap start and end portions 12b1' and 12b1" of the second connection patterns 12b1 which cross over the insulating layer 13. Therefore, static electricity induced from the exterior of the touch screen panel may be diffused into the conductive auxiliary patterns 14.

The conductive auxiliary patterns 14 may be electrically connected to the second connection patterns 12b1 and may be in direct contact with the second connection patterns 12b1. Accordingly, it may be possible to effectively prevent the disconnection defect of the second connection patterns 12b1.

As described above, according to the present embodiment, the conductive auxiliary patterns 14 may be formed at portions particularly weak to the static electricity, so that the static electricity may be diffused into the conductive auxiliary patterns 14, e.g., when it is induced from the exterior of the touch screen panel. Accordingly, Joule heating caused by the static electricity may be decreased, thereby preventing the disconnection defect of the second connection patterns 12b1.

For example, as illustrated in FIGS. 2 and 4, the conductive auxiliary pattern 14 may be locally positioned at the respective start and end portions 12b1' and 12b1" of a region R, i.e., a region of the second connection pattern 12b1 that crosses over the insulating layer 13. For example, the conductive auxiliary pattern 14 may extend on the second sensing cells 12b in parallel to the transparent substrate 10 and may extend on the second connection patterns 12b1 to overlap the insulating layer 13, e.g., the conductive auxiliary pattern 14 may have a bent structure. As such, e.g., the conductive auxiliary pattern 14 may overlap a connection region 12b2 between the second sensing cells 12b and the second connection patterns 12b1.

Figure 5:
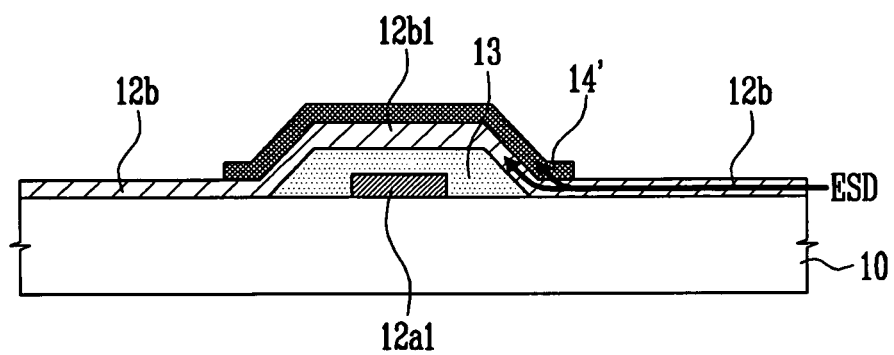
FIG. 5 illustrates a cross-sectional view of a conductive auxiliary pattern according to another embodiment.

According to another example embodiment, as shown in FIG. 5, a conductive auxiliary pattern 14' may be formed on each of the second connection patterns 12b1 so as to be connected from the start portion to the end portion of the section in which each of the second connection patterns 12b1 crosses over the insulating layer 13. For example, the conductive auxiliary pattern 14' may extend to, e.g., continuously, overlap the insulating layer 13 along the second direction. The conductive auxiliary patterns 14' may be formed of the same transparent electrode material as the first and second sensing cells 12a and 12b or of an opaque electrode material of low resistance.

As described above, according to example embodiments, a touch panel may include conductive auxiliary patterns on the second connection patterns above the insulating layer, so that static electricity may be diffused into the conductive auxiliary patterns. Accordingly, it may be possible to prevent a disconnection defect of the second connection patterns caused by static electricity, thereby preventing a driving failure of the touch screen panel.

In contrast, when conventional first and second connection patterns that connect respective first and second sensing cells have narrower widths than the respective sensing cells, resistance of the first and second patterns may be relatively increased. Accordingly, when static electricity is induced from the exterior of the touch screen panel, Joule heating may be concentrated on intersection portions of the first and second connection patterns, thereby triggering a disconnection defect or the like. Therefore, a driving failure of the touch screen panel may be caused by the disconnection defect or the like.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A touch screen panel, comprising:
   a transparent substrate;
   a plurality of first sensing cells on the transparent substrate, the first sensing cells being connected to each other along a first direction;
   a plurality of second sensing cells between the first sensing cells and insulated from the first sensing cells, the second sensing cells being connected to each other along a second direction;
   a plurality of first connection patterns connecting the first sensing cells along the first direction;
   a plurality of second connection patterns connecting the second sensing cells along the second direction, the second connection patterns intersecting the first connection patterns;
   an insulating layer between the first and second connection patterns, the second connection patterns crossing over the insulating layer; and
   a plurality of conductive auxiliary patterns on top of the second connection patterns and electrically connected to the second connection patterns, the second connection patterns being between the insulating layer and respective conductive auxiliary patterns.

2. The touch screen panel as claimed in claim 1, wherein the second connection pattern includes a region that crosses over the insulating layer, the conductive auxiliary patterns overlapping start and end portions of the region.

3. The touch screen panel as claimed in claim 2, wherein the region of the second connection pattern extends only between opposite edges of the insulating layer, the start and end portions of the region being aligned with the opposite edges of the insulating layer, respectively, and the region and the insulating layer being in direct contact with each other.

4. The touch screen panel as claimed in claim 1, wherein each of the conductive auxiliary patterns is positioned on the second connection pattern and is connected from a start portion to an end portion of a region of the second connection patterns that crosses over the insulating layer.

5. The touch screen panel as claimed in claim 1, wherein the conductive auxiliary patterns directly contact the second connection patterns.

6. The touch screen panel as claimed in claim 1, wherein each conductive auxiliary pattern overlaps at least one connection region between a second connection pattern and a respective second sensing cell, each conductive auxiliary pattern being in direct contact with a corresponding connection region.

7. The touch screen panel as claimed in claim 6, wherein the conductive auxiliary pattern has a bent shape, the conductive auxiliary pattern overlapping a portion of the second connection pattern and a portion of the respective second sensing cell.

8. The touch screen panel as claimed in claim 1, wherein each conductive auxiliary pattern is continuous along an entire length of the insulating layer, the length of the insulating layer extending along the second direction.

9. The touch screen panel as claimed in claim 1, wherein the first sensing cells are positioned in a same layer as the second sensing cells and are separated from one another, the first sensing cells being electrically connected via exposed regions on the first connection patterns.

10. The touch screen panel as claimed in claim 1, wherein the second sensing cells and the second connection patterns are integral with each other.

11. The touch screen panel as claimed in claim 1, wherein an entire length of each conductive auxiliary pattern is in direct contact with a respective second connection pattern.

12. The touch screen panel as claimed in claim 1, wherein the conductive auxiliary patterns are external relative to the second connection patterns.

* * * * *

US008749514C1

(12) EX PARTE REEXAMINATION CERTIFICATE (55th)
Ex Parte Reexamination Ordered under 35 U.S.C. 257

United States Patent
Jeong et al.

(10) Number: US 8,749,514 C1
(45) Certificate Issued: Jun. 24, 2016

(54) TOUCH SCREEN PANEL

(75) Inventors: Hwan-Hee Jeong, Yongin (KR);
Sung-Ku Kang, Yongin (KR)

(73) Assignee: SAMSUNG DISPLAY CO., LTD.

Supplemental Examination Request:
No. 96/000,121, Nov. 25, 2015

Reexamination Certificate for:
Patent No.: 8,749,514
Issued: Jun. 10, 2014
Appl. No.: 12/926,004
Filed: Oct. 20, 2010

(30) Foreign Application Priority Data

Mar. 23, 2010 (KR) ........................ 10-2010-0025662

(51) Int. Cl.
*G06F 3/044* (2006.01)
(52) U.S. Cl.
CPC ....................................... *G06F 3/044* (2013.01)
(58) Field of Classification Search
None
See application file for complete search history.

(56) References Cited

To view the complete listing of prior art documents cited during the supplemental examination proceeding and the resulting reexamination proceeding for Control Number 96/000,121, please refer to the USPTO's public Patent Application Information Retrieval (PAIR) system under the Display References tab.

*Primary Examiner* — Simon Ke

(57) ABSTRACT

A touch screen panel includes a transparent substrate, a plurality of first sensing cells on the transparent substrate, the first sensing cells being connected to each other along a first direction, a plurality of second sensing cells between the first sensing cells and insulated from the first sensing cells, the second sensing cells being connected to each other along a second direction, a plurality of first connection patterns connecting the first sensing cells along the first direction, a plurality of second connection patterns connecting the second sensing cells along the second direction, the second connection patterns intersecting the first connection patterns, an insulating layer between the first and second connection patterns, the second connection patterns crossing over the insulating layer, and a plurality of conductive auxiliary patterns on the second connection patterns and electrically connected to the second connection patterns.

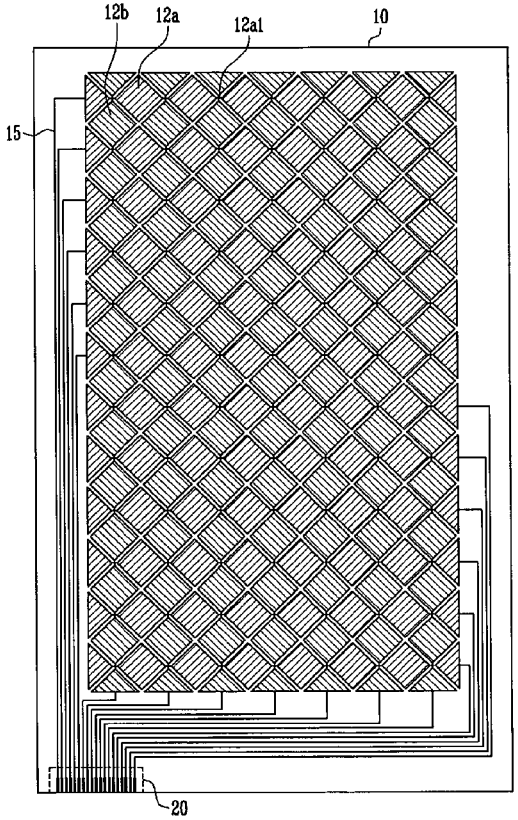

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-12 is confirmed.

New claims 13-14 are added and determined to be patentable.

*13. The touch screen panel as claimed in claim 1, wherein the second connection patterns are disposed between adjacent second sensing cells and include a region that crosses over the insulating layer between said adjacent second sensing cells.*

*14. The touch screen panel as claimed in claim 13, wherein the conductive auxiliary patterns are disposed between adjacent second sensing cells, and overlap start and end portions of the region.*

\* \* \* \* \*